(12) United States Patent
Bell et al.

(10) Patent No.: US 11,486,422 B2
(45) Date of Patent: Nov. 1, 2022

(54) ADAPTABLE PUSH-ON STUD FASTENER

(71) Applicant: ILLINOIS TOOL WORKS INC., Glenview, IL (US)

(72) Inventors: Kileean Bell, Crete, IL (US); Mark Lepper, Oak Park, IL (US)

(73) Assignee: Illinois Tool Works Inc., Glenview, IL (US)

( * ) Notice: Subject to any disclaimer, the term of this patent is extended or adjusted under 35 U.S.C. 154(b) by 394 days.

(21) Appl. No.: 16/797,555

(22) Filed: Feb. 21, 2020

(65) Prior Publication Data

US 2020/0309171 A1 Oct. 1, 2020

Related U.S. Application Data

(60) Provisional application No. 62/824,758, filed on Mar. 27, 2019.

(51) Int. Cl.
  *F16B 2/08* (2006.01)
  *F16B 21/07* (2006.01)
  *F16B 37/08* (2006.01)

(52) U.S. Cl.
  CPC .............. *F16B 2/08* (2013.01); *F16B 21/073* (2013.01); *F16B 21/078* (2013.01); *F16B 37/0857* (2013.01)

(58) Field of Classification Search
  CPC ..... F16L 3/2235; F16L 3/2334; F16L 3/1075; Y10T 24/1498; Y10T 24/44017; F16B 2/08; F16B 21/073; F16B 21/078; F16B 21/08; F16B 21/20; F16B 37/0857
  See application file for complete search history.

(56) References Cited

U.S. PATENT DOCUMENTS

| 5,782,597 | A | 7/1998 | Meyer | |
|---|---|---|---|---|
| 5,803,413 | A * | 9/1998 | Benoit | F16L 3/2334 248/74.3 |
| 8,328,488 | B2 * | 12/2012 | Luk | F16B 37/0857 248/68.1 |
| 8,910,912 | B2 * | 12/2014 | Child | F16L 55/035 248/68.1 |
| 8,967,556 | B2 * | 3/2015 | Meyers | H02G 3/32 248/68.1 |
| 8,979,461 | B2 | 3/2015 | Pearson et al. | |
| 2006/0099049 | A1 * | 5/2006 | Peterson | F16B 39/32 411/433 |
| 2010/0207001 | A1 * | 8/2010 | Smith | F16L 55/035 248/230.4 |

FOREIGN PATENT DOCUMENTS

EP  2141397 A1 * 1/2010 ......... B60R 16/0215

* cited by examiner

*Primary Examiner* — Robert Sandy
(74) *Attorney, Agent, or Firm* — Quarles & Brady LLP

(57) ABSTRACT

A push-on fastener includes a base, a first radial barb, an axial support, a second radial barb, and a protrusion. The base defines an opening. The first radial barb extends from the base. The axial support extends from the base. The second radial barb extends from the axial support. The protrusion extends from the axial support.

20 Claims, 12 Drawing Sheets

ADAPTABLE PUSH-ON STUD FASTENER

RELATED APPLICATION

This application claims priority to U.S. provisional application No. 62/824,758, filed on 27 Mar. 2019, which is incorporated by reference herein in its entirety.

FIELD OF THE DISCLOSURE

This disclosure relates generally to automotive fasteners and, more particularly, to an adaptable push-on stud fastener.

BACKGROUND

In recent years, push-on fasteners have been developed to snapably engage threads of threaded vehicle body studs to attach various components to the vehicle body. For example, push-on fasteners are often equipped with various attachment features (e.g., hooks, clamps, hangers, etc.). The push-on fasteners engage with the studs. The attachment features connect vehicle components to the push-on fasteners.

Certain known push-on fasteners are equipped with inwardly-facing barbs. When the push-on fastener is pushed onto a threaded stud, the barbs engage the threads of the stud to retain the push-on fastener on the stud.

However, these known push-on fasteners do not work on multiple stud sizes and/or require a high installation force to be pushed onto a stud.

Therefore, a need exists for a push-on fastener that adapts to multiple stud sizes and meets ergonomic installation force requirements.

SUMMARY

In one aspect, a push-on fastener is disclosed, which includes a base, a first radial barb, an axial support, a second radial barb, and a protrusion. The base defines an opening. The first radial barb extends from the base. The axial support extends from the base. The second radial barb extends from the axial support. The protrusion extends from the axial support.

In another aspect, a push-on fastener is disclosed, which includes a body and a cover. The body includes a base, a first radial barb, an axial support, and a second radial barb. The base defines an opening. The first radial barb extends from the base. The axial support extends from the base. The second radial barb extends from the axial support. The cover is pivotably connected to the body to selectively define an opening with the body.

In another aspect, a push-on fastener is disclosed, which includes a base and a plurality of barbs. The base defines an opening. The plurality of barbs overshadow the opening and are shaped to ratchetingly engage a stud.

DETAILED DESCRIPTION

Figure 1:
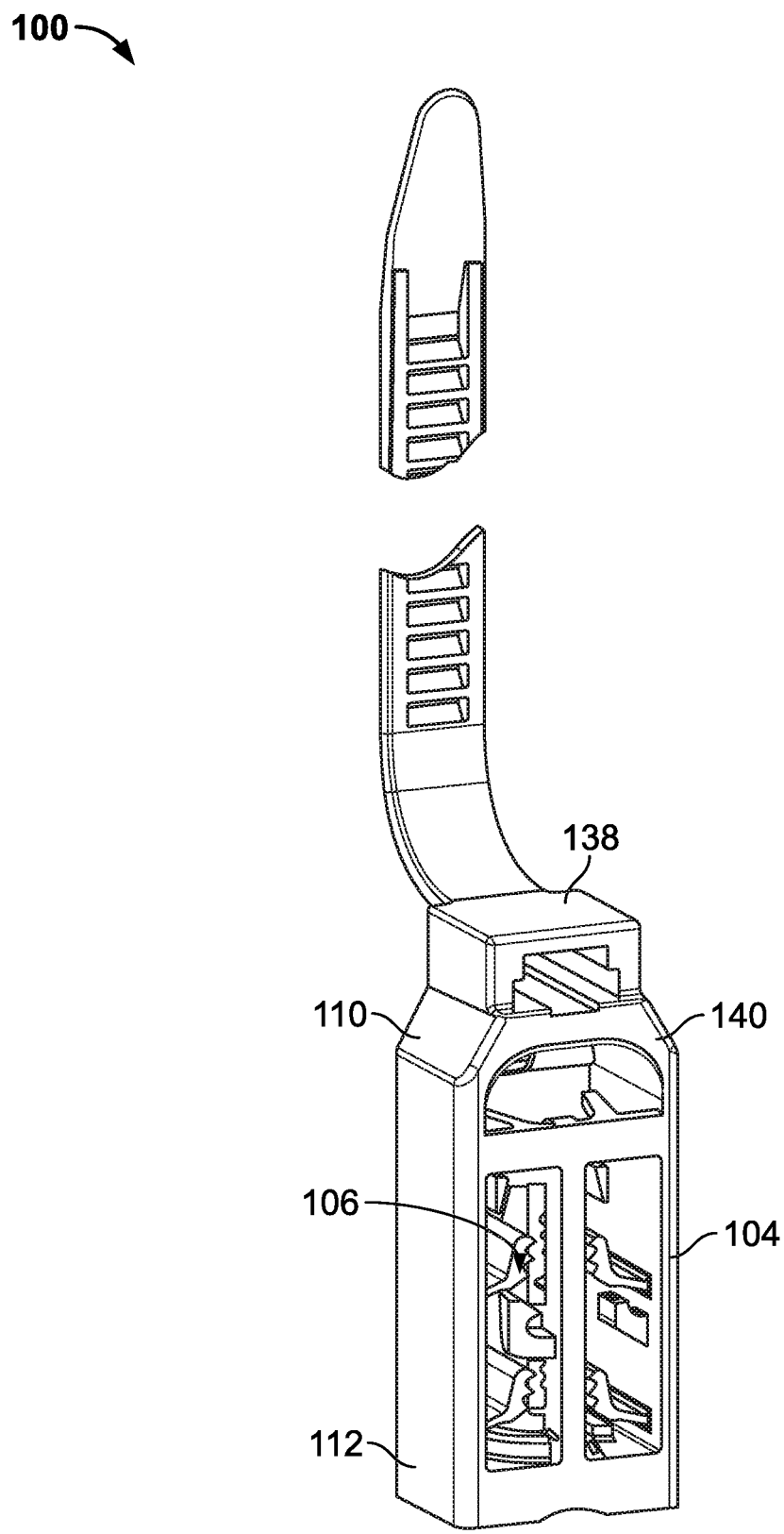
FIG. 1 is an isometric view of a first example push-on fastener.

As explained herein, the present disclosure provides a push-on fastener that adapts to multiple stud sizes. Additionally, the push-on fastener may have a reduced installation force to meet ergonomic requirements. As non-limiting examples, the push-on fastener may have a zip tie, a hook, a hanger, a clamp, etc., to engage with vehicle components.

With reference to FIGS. 1-8, a push-on fastener 100 includes a body 104 and a plurality of stud-engaging features 106. The body 104 includes a top portion 110 and a base portion 112. Looking at FIGS. 5, 6, 10, and 11, the base portion 112 defines a first cutout 114, a second cutout 116, and an opening 118.

Figure 6:
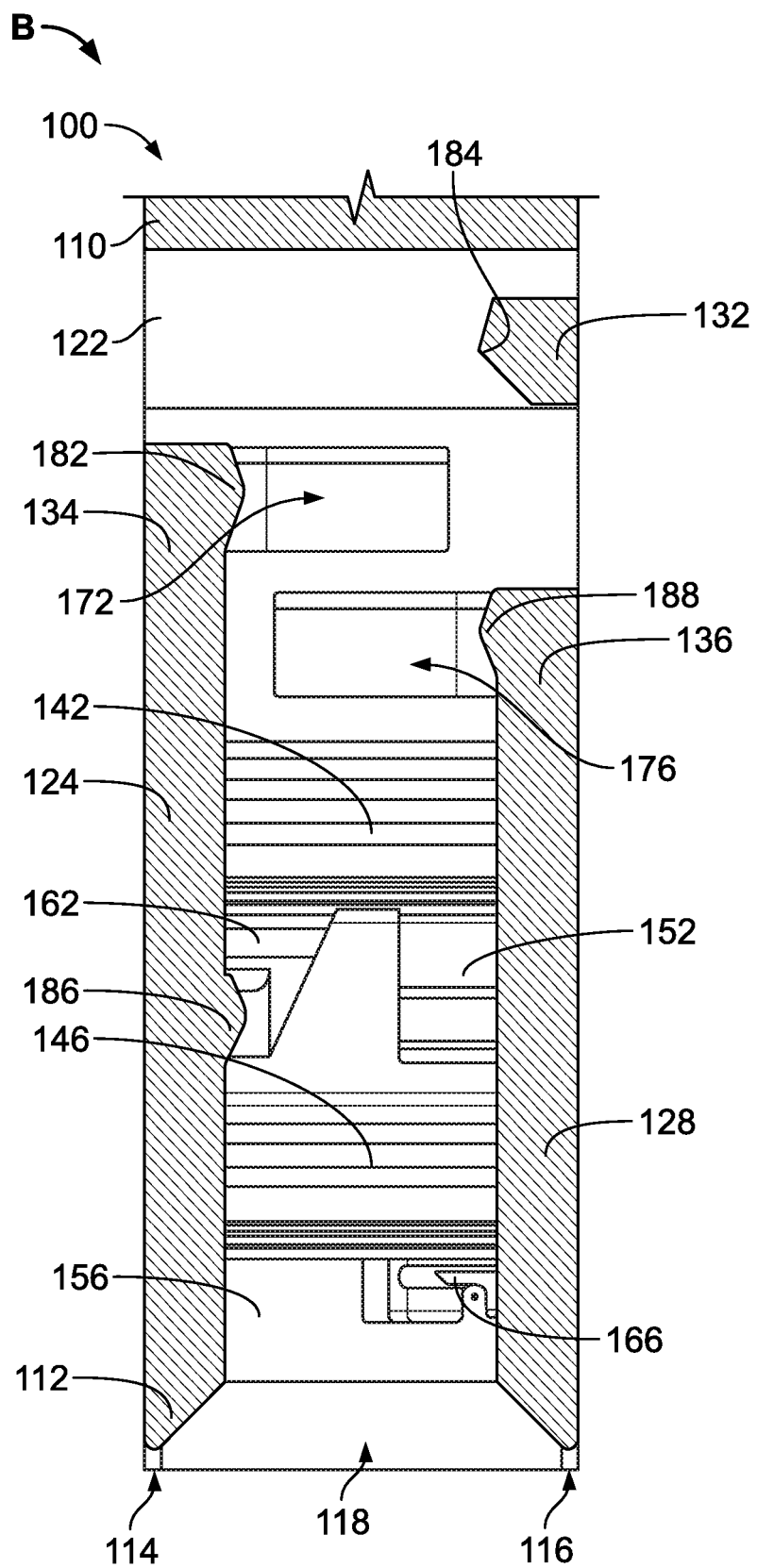
FIG. 6 is a partial cross-sectional view of the push-on fastener of FIGS. 1-5 taken from section B and along line 6-6 of FIG. 2.
Figure 7:
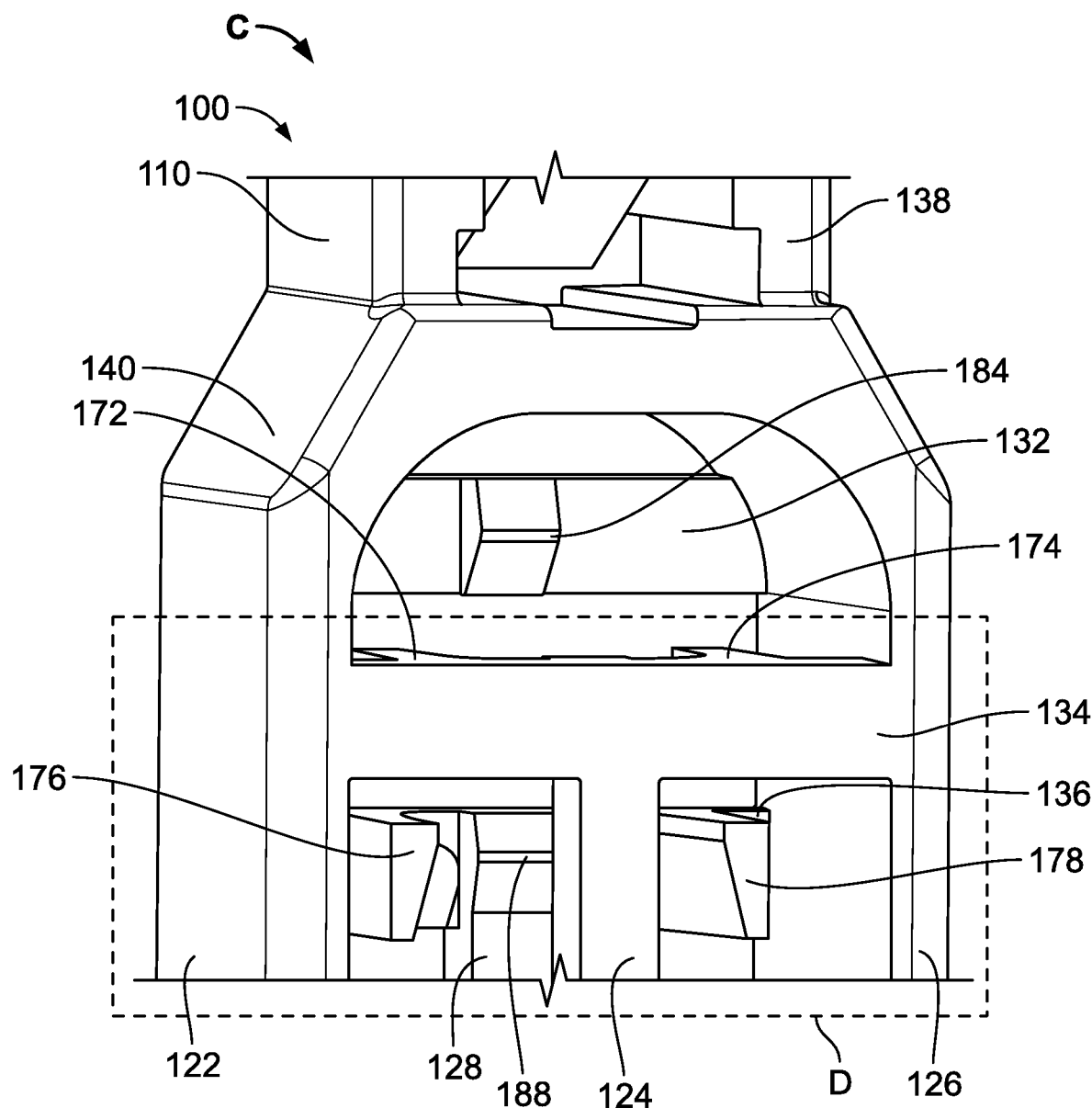
FIG. 7 is an enlarged partial isometric view of the push-on fastener of FIGS. 1-6 taken from section C of FIG. 2.

With reference to FIGS. 2-4 and 7-9, the body 104 also includes a first axial support 122, a second axial support 124, and a third axial support 126. Looking at FIGS. 5-8, the body 104 also includes a fourth axial support 128. Referring to FIG. 7, the first axial support 122 is opposite the third axial support 126. The second axial support 124 is opposite the fourth axial support 128. The first axial support 122, the second axial support 124, the third axial support 126, and the fourth axial support 128 are generally parallel with one another. The first axial support 122 is between the second axial support 124 and the fourth axial support 128. The third axial support 126 is also between the second axial support 124 and the fourth axial support 128. The second axial support 124 is between the first axial support 122 and the third axial support 126. The fourth axial support 128 is also between the first axial support 122 and the third axial support 126.

With reference to FIGS. 2 and 6-9, the body 104 also includes a first cross bar 132, a second cross bar 134, and a third cross bar 136. With reference to FIG. 7, the first cross bar 132 and the third cross bar 136 are opposite the second cross bar 134. The second cross bar 134 is between the first cross bar 132 and the third cross bar 136. The first cross bar 132, the second cross bar 134, and the third cross bar 136 are generally parallel with one another. The first cross bar 132 and the third cross bar 136 are connected generally perpendicularly to and extend between the first axial support 122 and the third axial support 126. The second cross bar 134 is connected generally perpendicularly to and extends between the first axial support 122 and the third axial support 126. With reference to FIG. 6, the second axial support 124 is connected generally perpendicularly to and extends between the second cross bar 134 and the base portion 112. The fourth axial support 128 is connected generally perpendicularly to and extends between the third cross bar 136 and the base portion 112.

Figure 2:
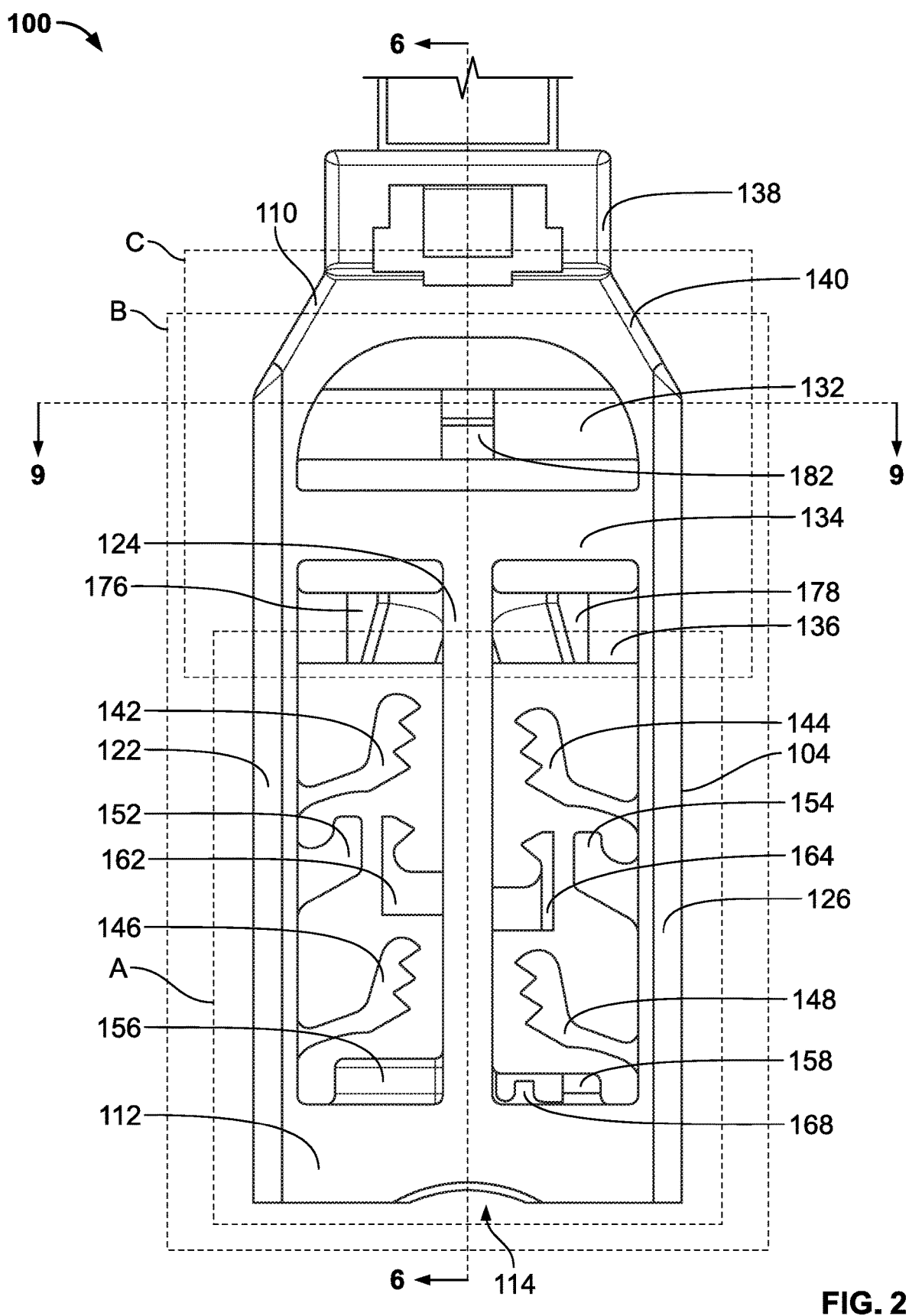
FIG. 2 is a partial elevational view of the push-on fastener of FIG. 1.

With reference to FIGS. 1, 2, and 7, the top portion 110 includes a component attachment feature 138 and a ramp portion 140. In the example of FIGS. 1 and 2, the component attachment feature 138 is a zip tie. With reference to FIG. 7, the ramp portion 140 is connected to and extends between the component attachment feature 138, the first axial support 122, and the third axial support 126. The component attachment feature 138 extends from the ramp portion 140 opposite the first axial support 122 and the third axial support 126. The component attachment feature 138 is narrower than the first cross bar 132, the second cross bar 134, and the third cross bar 136. Thus, the ramp portion 140 is tapered. In some embodiments, the ramp portion 140 is arched and/or bridge-shaped.

Figure 3:
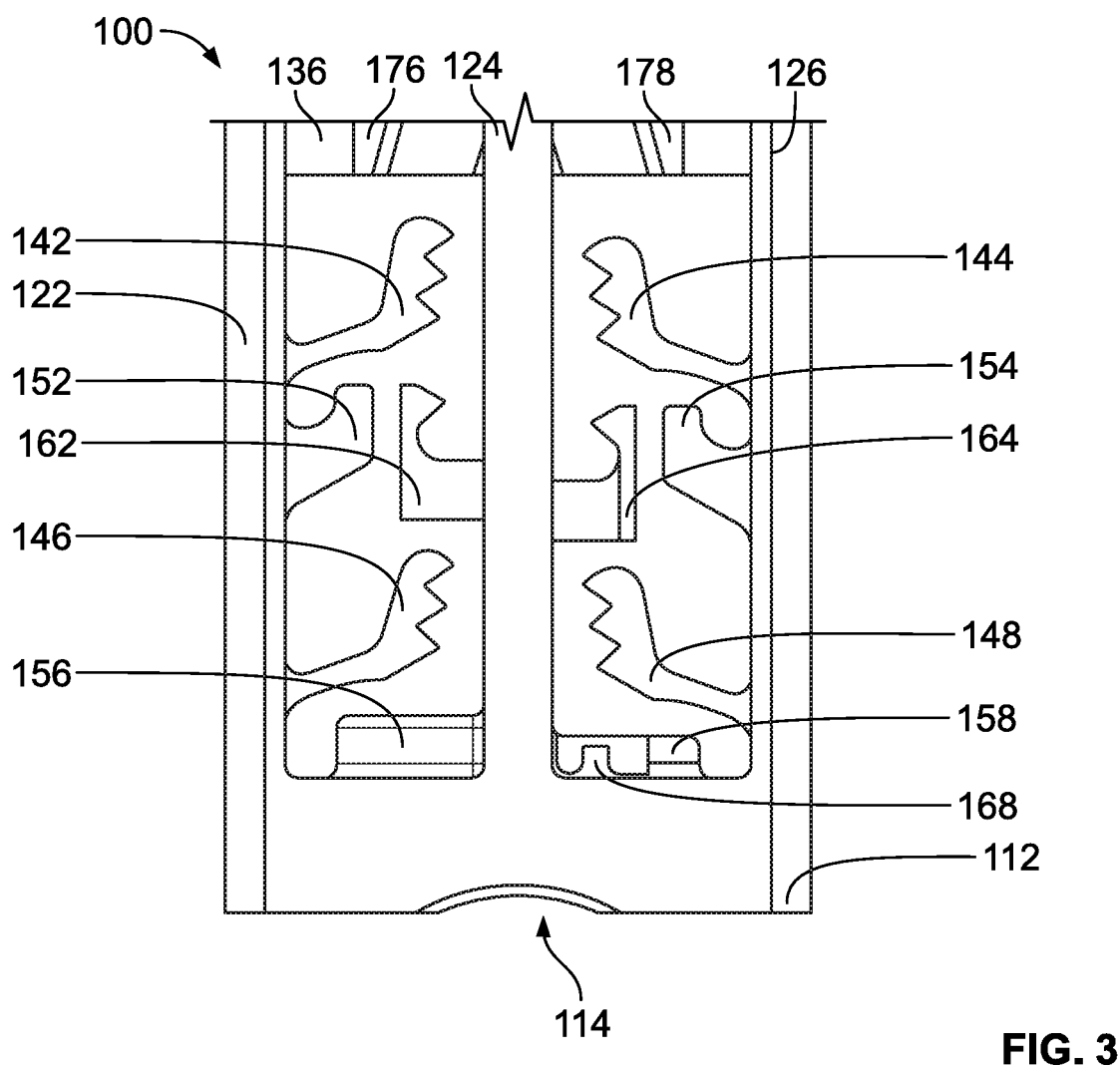
FIG. 3 is an enlarged partial elevational view of the push-on fastener of FIGS. 1 and 2 taken from section A of FIG. 2.
Figure 4:
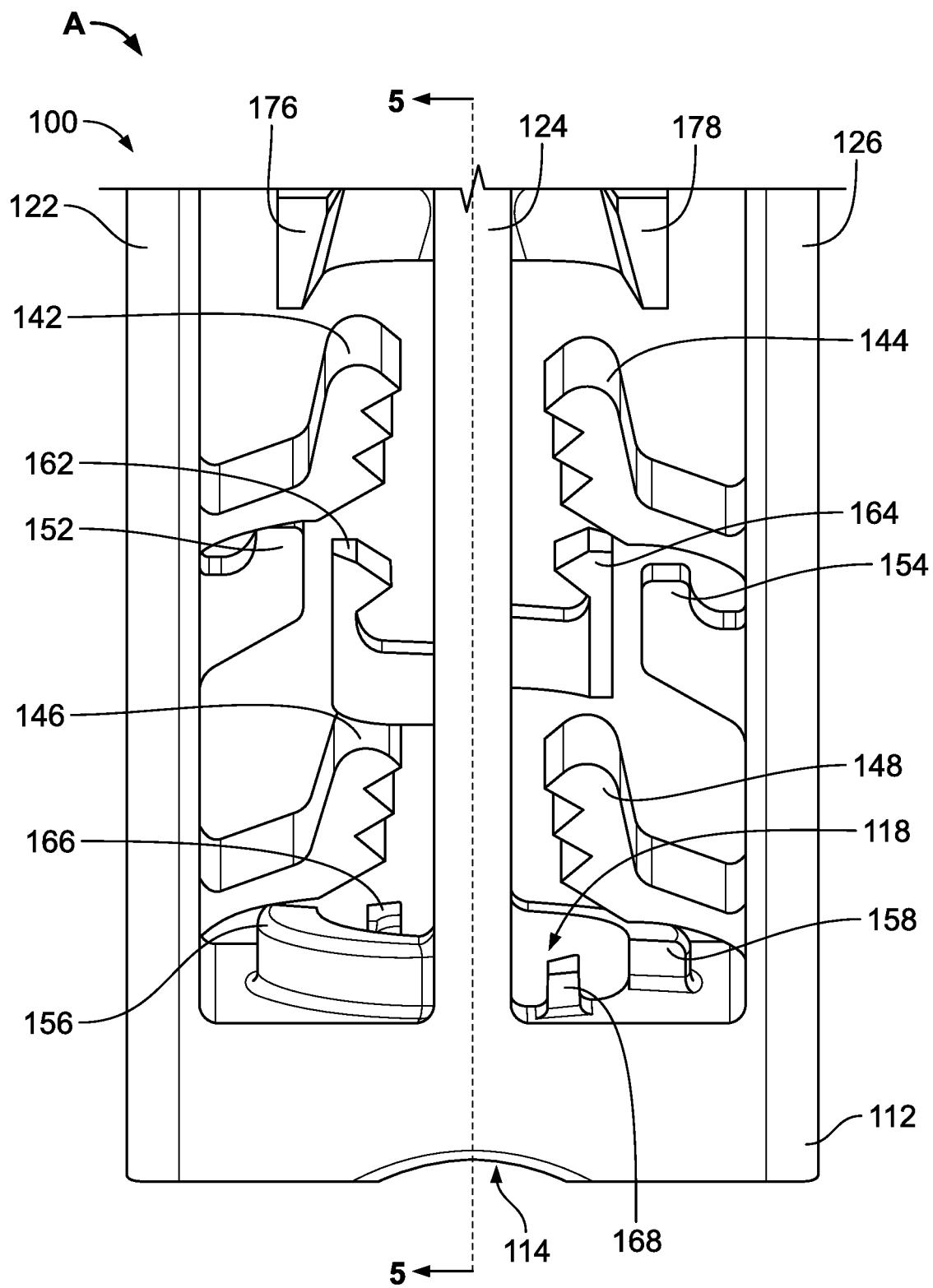
FIG. 4 is an enlarged partial isometric view of the push-on fastener of FIGS. 1-3 taken from section A of FIG. 2.
Figure 5:
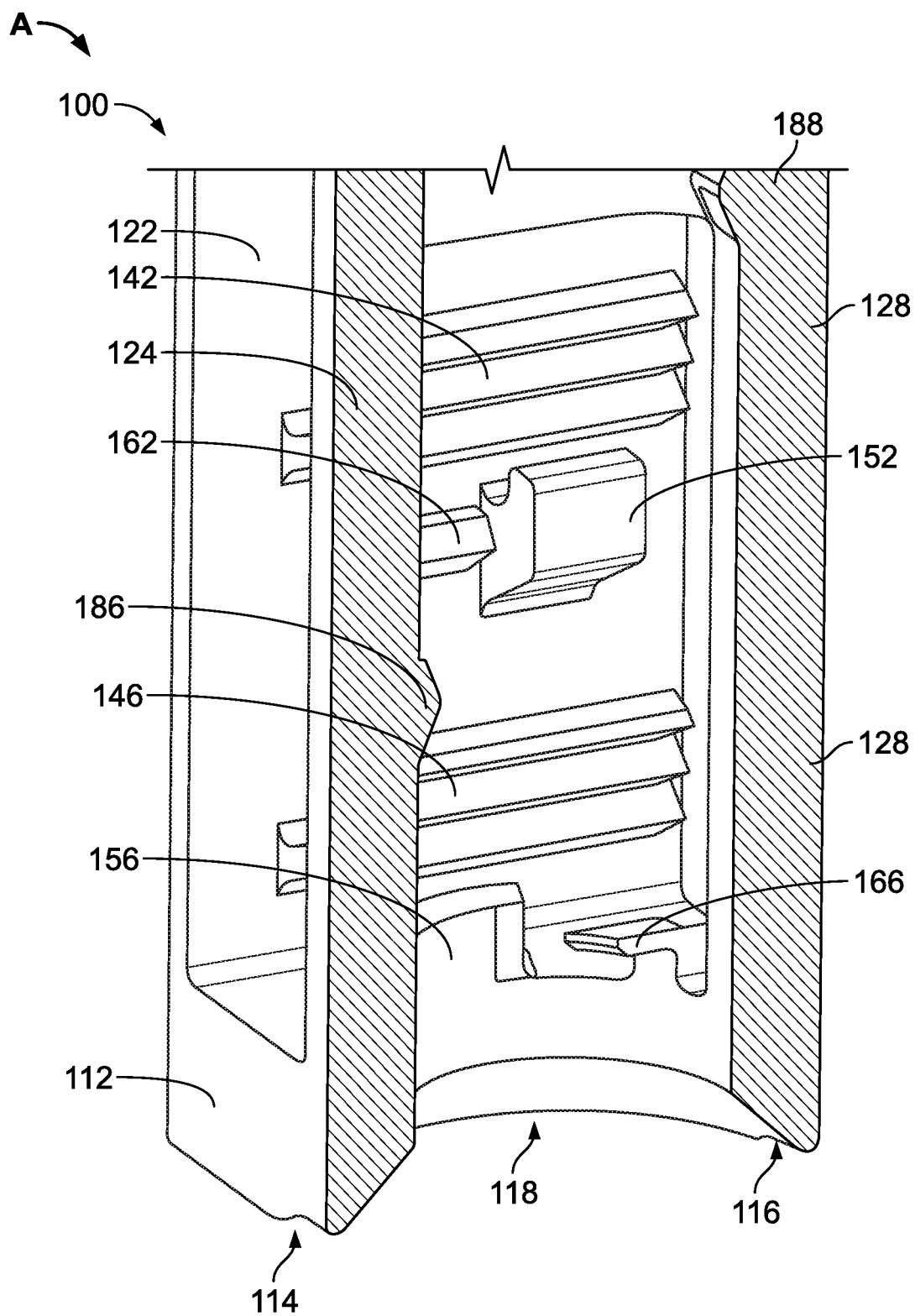
FIG. 5 is an enlarged partial isometric cross-sectional view of the push-on fastener of FIGS. 1-4 taken from section A of FIG. 1 along line 5-5 of FIG. 4.

With reference to FIGS. 2, 3, and 4, the plurality of stud-engaging features 106 includes a first toothed lever 142, a second toothed lever 144, a third toothed lever 146, and a fourth toothed lever 148. With reference to FIG. 4, the first toothed lever 142 and the third toothed lever 146 are resiliently pivotably connected to and extend from the first axial support 122. The second toothed lever 144 and the fourth toothed lever 148 are resiliently pivotably connected to and extend from the third axial support 126. The first toothed lever 142 and the third toothed lever 146 are opposite the second toothed lever 144 and the fourth toothed lever 148. The first toothed lever 142 and the second toothed lever 144 extend toward one another. The third toothed lever 146 and the fourth toothed lever 148 extend toward one another. The first toothed lever 142, the second toothed lever 144, the third toothed lever 146, and the fourth toothed lever 148 overshadow the opening 118.

With reference to FIGS. 2, 3, and 4, the plurality of stud-engaging features 106 also includes a first stop 152, a second stop 154, a third stop 156, and a fourth stop 158. With reference to FIG. 4, the first stop 152 is connected to and extends from the first axial support 122. The second stop 154 is connected to and extends from the third axial support 126. The first stop 152 and the second stop 154 are opposite and extend toward one another. The first stop 152 is between the first toothed lever 142 and the third toothed lever 146. The second stop 154 is between the second toothed lever 144 and the fourth toothed lever 148. The third stop 156 and the fourth stop 158 are connected to and extend from the base portion 112. The third stop 156 and the fourth stop 158 are opposite one another. The third stop 156 and the fourth stop 158 extend toward the third toothed lever 146 and the fourth toothed lever 148. The third stop 156 and the fourth stop 158 partially define the opening 118.

With reference to FIGS. 2-4 and 6, the plurality of stud-engaging features 106 also includes a first radial barb 162 and a second radial barb 164. Referring to FIG. 4 specifically, the plurality of stud-engaging features 106 also includes a third radial barb 166 and a fourth radial barb 168. The first radial barb 162 and the second radial barb 164 are opposite one another. The third radial barb 166 and the fourth radial barb 168 are also opposite one another. The first radial barb 162 is resiliently pivotably connected to and extends arcuately from the second axial support 124 toward the first stop 152. The second radial barb 164 is resiliently pivotably connected to the fourth axial support 128 (not shown). The second radial barb 164 extends arcuately toward the second stop 154. The third radial barb 166 and the fourth radial barb 168 are opposite one another. The third radial barb 166 and the fourth radial barb 168 are resiliently pivotably connected to and extend from the base portion 112. The third radial barb 166 extends toward the third stop 156 and into the opening 118. The first radial barb 162 and the second radial barb 164 overshadow the opening 118. The fourth radial barb 168 extends toward the fourth stop 158 and into the opening 118.

Figure 8:
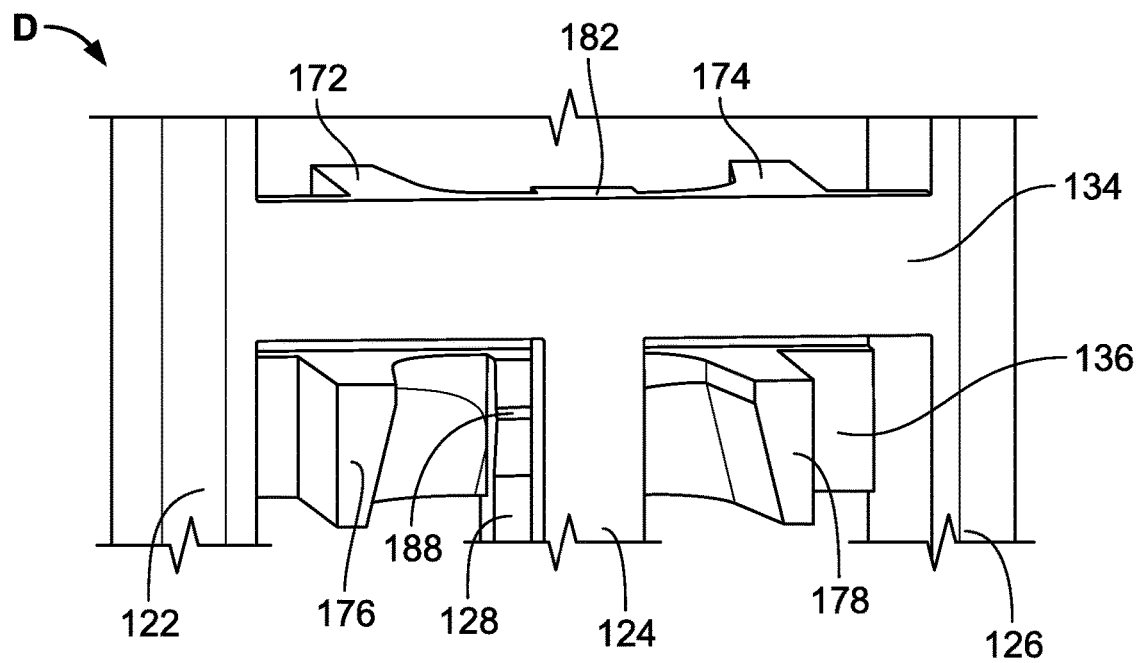
FIG. 8 is an enlarged partial isometric view of the push-on fastener of FIGS. 1-7 taken from section D of FIG. 7.
Figure 9:
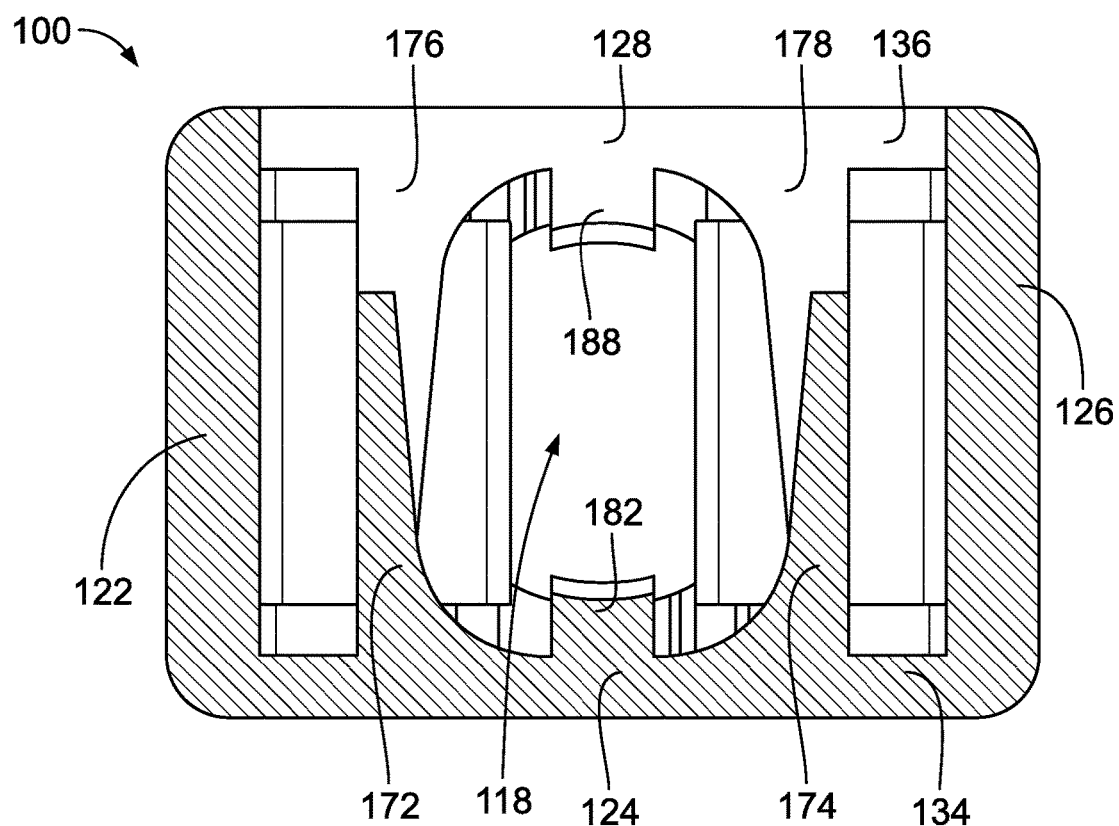
FIG. 9 is a cross-sectional view of the push-on fastener of FIGS. 1-8 taken along line 9-9 of FIG. 2.

With reference to FIGS. 7-9, the plurality of stud-engaging features 106 also includes a first arcuate post 172, a second arcuate post 174, a third arcuate post 176, and a fourth arcuate post 178. The first arcuate post 172 and the second arcuate post 174 are connected to and extend from the second cross bar 134 between the first axial support 122 and the third axial support 126. The third arcuate post 176 and the fourth arcuate post 178 are connected to and extend from the third cross bar 136 between the first axial support 122 and the third axial support 126. The first arcuate post 172, the second arcuate post 174, the third arcuate post 176, and the fourth arcuate post 178 are shaped to engage a stud to reduce tilting of the push-on fastener 100 relative to the stud. In some applications, the first arcuate post 172, the second arcuate post 174, the third arcuate post 176, and the fourth arcuate post 178 slidably fit with the stud (e.g., via a clearance fit). In some applications, the first arcuate post 172, the second arcuate post 174, the third arcuate post 176, and the fourth arcuate post 178 tightly fit with the stud (e.g., via an interference fit) to reduce rotation of the push-on fastener 100 about the stud.

With reference to FIG. 6, the plurality of stud-engaging features 106 also includes a first protrusion 182, a second protrusion 184, a third protrusion 186, and a fourth protrusion 188. In some applications, the first protrusion 182, the second protrusion 184, the third protrusion 186, and/or the fourth protrusion 188 engage threads of a stud to tension and provide radial support to the push-on fastener 100. In other applications, the first protrusion 182, the second protrusion 184, the third protrusion 186, and/or the fourth protrusion 188 are tangential to and/or have a slight clearance with respect to a stud. The third protrusion 186 is connected to and extends from the second axial support 124 between the first axial support 122 and the third axial support 126 (shown in FIG. 2). With reference to FIG. 9, the first protrusion 182 is connected to and extends from the second cross bar 134 between the first arcuate post 172 and the second arcuate post 174. The fourth protrusion 188 is connected to and extends from the third cross bar 136 between the third arcuate post 176 and the fourth arcuate post 178. With reference to FIG. 7, the second protrusion 184 is connected to and extends from the first cross bar 132 between the first axial support 122 and the third axial support 126.

Figure 10:
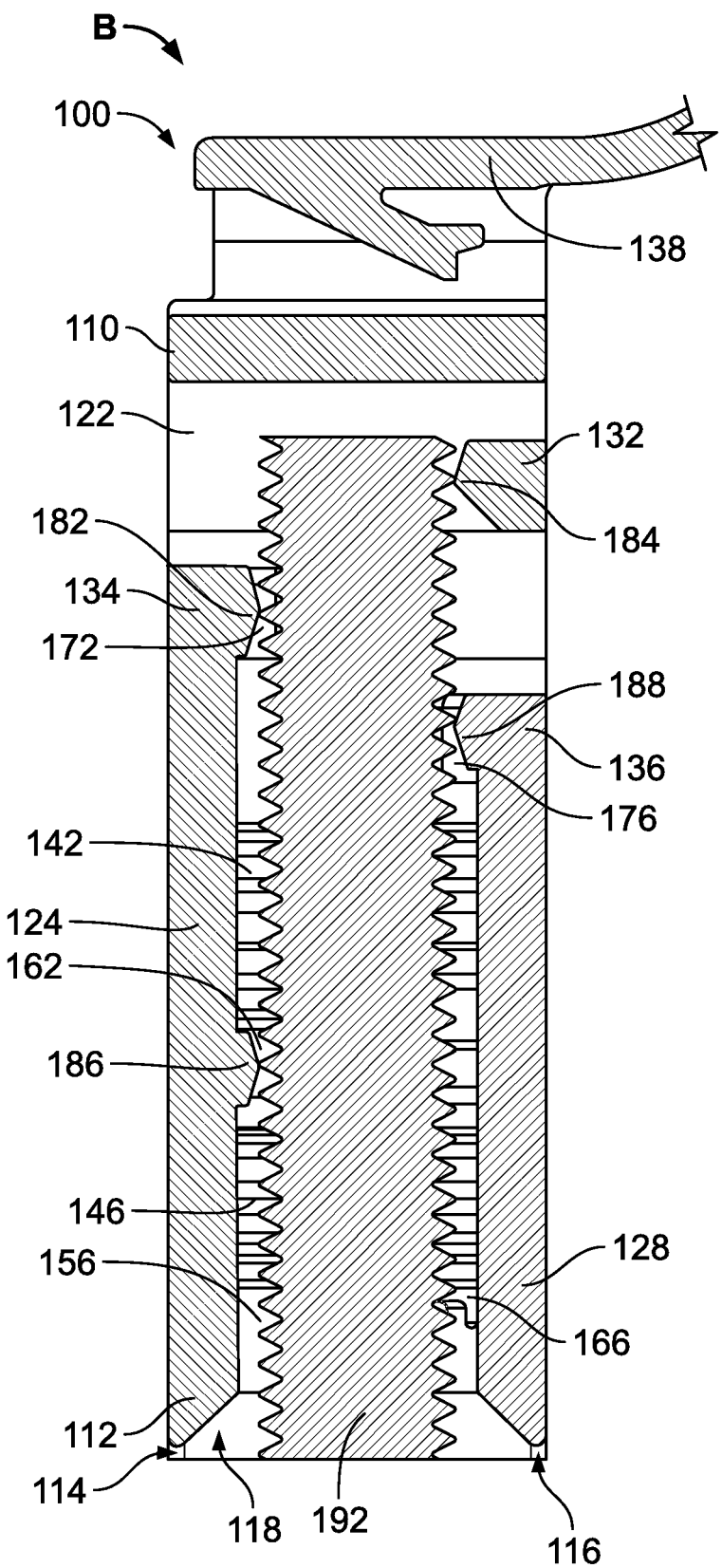
FIG. 10 is a cross-sectional view of the push-on fastener of FIGS. 1-9 taken along line 6-6 as installed on a first stud.

With reference to FIG. 10, the push-on fastener 100 is adapted to engage with a first stud 192. The first stud 192 is externally threaded. When the push-on fastener 100 is engaged with the first stud 192, the first protrusion 182, the second protrusion 184, the third protrusion 186, the fourth protrusion 188, the first toothed lever 142, the third toothed lever 146, the first radial barb 162, the third radial barb 166, the first arcuate post 172, and the third arcuate post 176 contact the first stud 192. It should be understood that when the push-on fastener 100 is engaged with the first stud 192, the second toothed lever 144, the fourth toothed lever 148, the second radial barb 164, the fourth radial barb 168, the second arcuate post 174, and the fourth arcuate post 178 also contact the first stud 192 (not shown).

With reference to FIG. 10, in operation, as the first stud 192 is inserted into the push-on fastener 100, the first toothed lever 142 and the third toothed lever 146 flex relative to the first axial support 122 to ratchetingly engage the first stud 192. Additionally in operation, as the first stud 192 is inserted into the push-on fastener 100, the first radial barb 162 flexes relative to the second axial support 124 to ratchetingly engage the first stud 192. Further in operation, as the first stud 192 is inserted into the push-on fastener 100, the third radial barb 166 flexes relative to the base portion 112 to ratchetingly engage the first stud 192. In other words, as the first stud 192 is pushed against and across the first toothed lever 142, the third toothed lever 146, the first radial barb 162, and the third radial barb 166, the first toothed lever 142, the third toothed lever 146, the first radial barb 162, and the third radial barb 166 successively bend away from and snap back against the externally threaded first stud 192. It should be understood that in operation, as the first stud 192 is inserted into the push-on fastener 100, the second toothed lever 144, the fourth toothed lever 148, the second radial barb 164, and the fourth radial barb 168 successively bend away from and snap back against the externally threaded first stud 192 to ratchetingly engage the first stud 192 in the same manner as the first toothed lever 142, the third toothed lever 146, the first radial barb 162, and the third radial barb 166 (not shown).

With reference to FIG. 10, if a force is applied to separate the first stud 192 from the push-on fastener 100, the third toothed lever 146 may flex relative to the first axial support 122 to contact the third stop 156. Thus, the third stop 156 provides a hard stop to the third toothed lever 146. In other words, the third stop 156 limits pivoting movement of the third toothed lever 146 relative to the first axial support 122. Further, the first toothed lever 142 may flex relative to the first axial support 122 to contact the first stop 152 (shown in FIG. 6). Thus, the first stop 152 provides a hard stop to the first toothed lever 142. In other words, the first stop 152 limits pivoting movement of first toothed lever 142 relative to the first axial support 122. It should be understood that the second stop 154 provides a hard stop to limit pivoting movement of the second toothed lever 144 in the same manner as the first stop 152 and the first toothed lever 142. Additionally, it should be understood that the fourth stop 158 provides a hard stop to limit pivoting movement of the fourth toothed lever 148 in the same manner as the third toothed lever 146 and the third stop 156.

Figure 11:
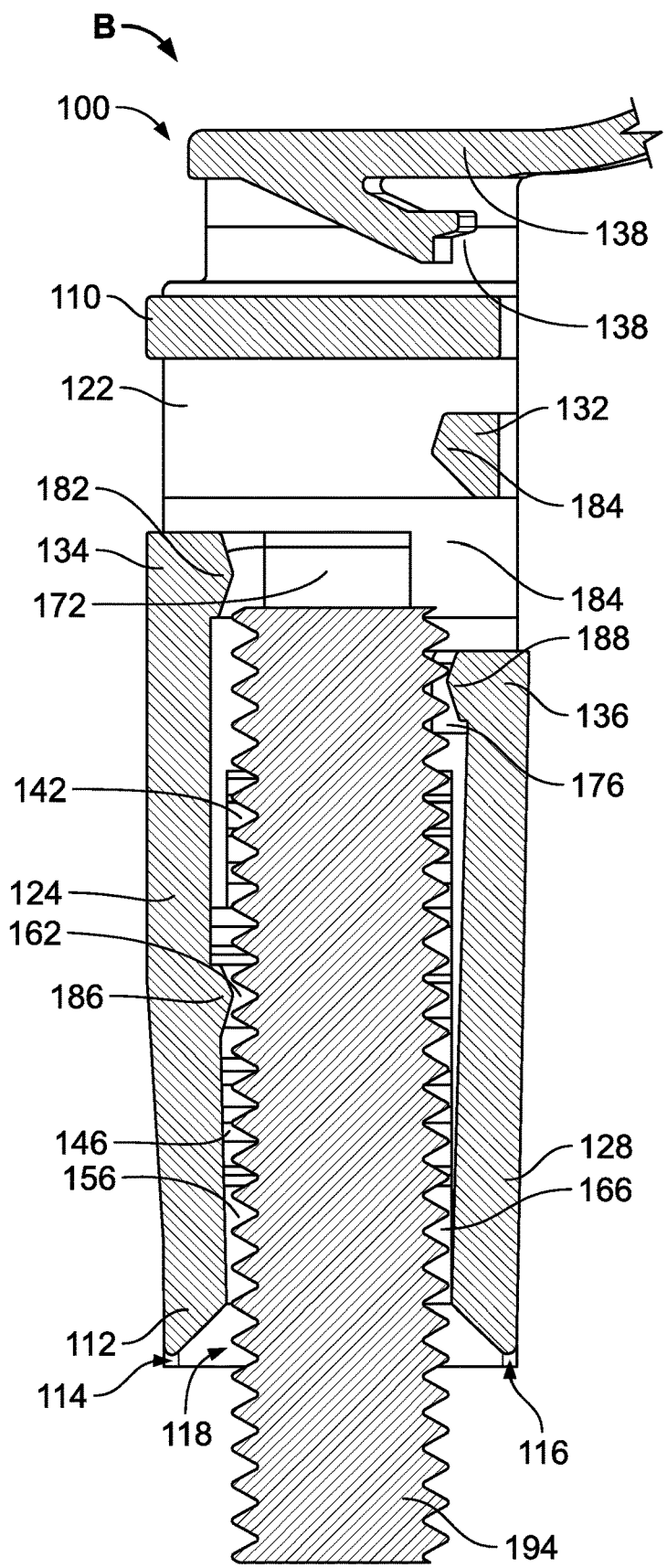
FIG. 11 is a cross-sectional view of the push-on fastener of FIGS. 1-9 taken along line 6-6 as installed on a second stud.

With reference to FIG. 11, the push-on fastener 100 is adapted to engage with a second stud 194. The second stud 194 is externally threaded. The second stud 194 is larger in diameter than the first stud 192. When the push-on fastener 100 is engaged with the second stud 194, the third protrusion 186, the fourth protrusion 188, the first toothed lever 142, the third toothed lever 146, the first radial barb 162, the third radial barb 166, the first arcuate post 172, and the third arcuate post 176 contact the second stud 194. It should be appreciated that the second axial support 124 and the fourth axial support 128 are deflected outwardly by the second stud 194. It should be understood that when the push-on fastener 100 is engaged with the second stud 194, the second toothed lever 144, the fourth toothed lever 148, the second radial barb 164, the fourth radial barb 168, the second arcuate post 174, and the fourth arcuate post 178 also contact the second stud 194 (not shown).

With reference to FIG. 11, in operation, as the second stud 194 is inserted into the push-on fastener 100, the first toothed lever 142, the third toothed lever 146, the first radial barb 162, and the third radial barb 166 successively bend away from and snap back against the externally threaded second stud 194 to ratchetingly engage the second stud 194 in the same manner as the first stud 192 (shown in FIG. 10). It should be understood that in operation, the second toothed lever 144, the fourth toothed lever 148, the second radial barb 164, and the fourth radial barb 168 also successively bend away from and snap back against the externally threaded second stud 194 to ratchetingly engage the second stud 194 in the same manner as the first stud 192.

Figure 12:
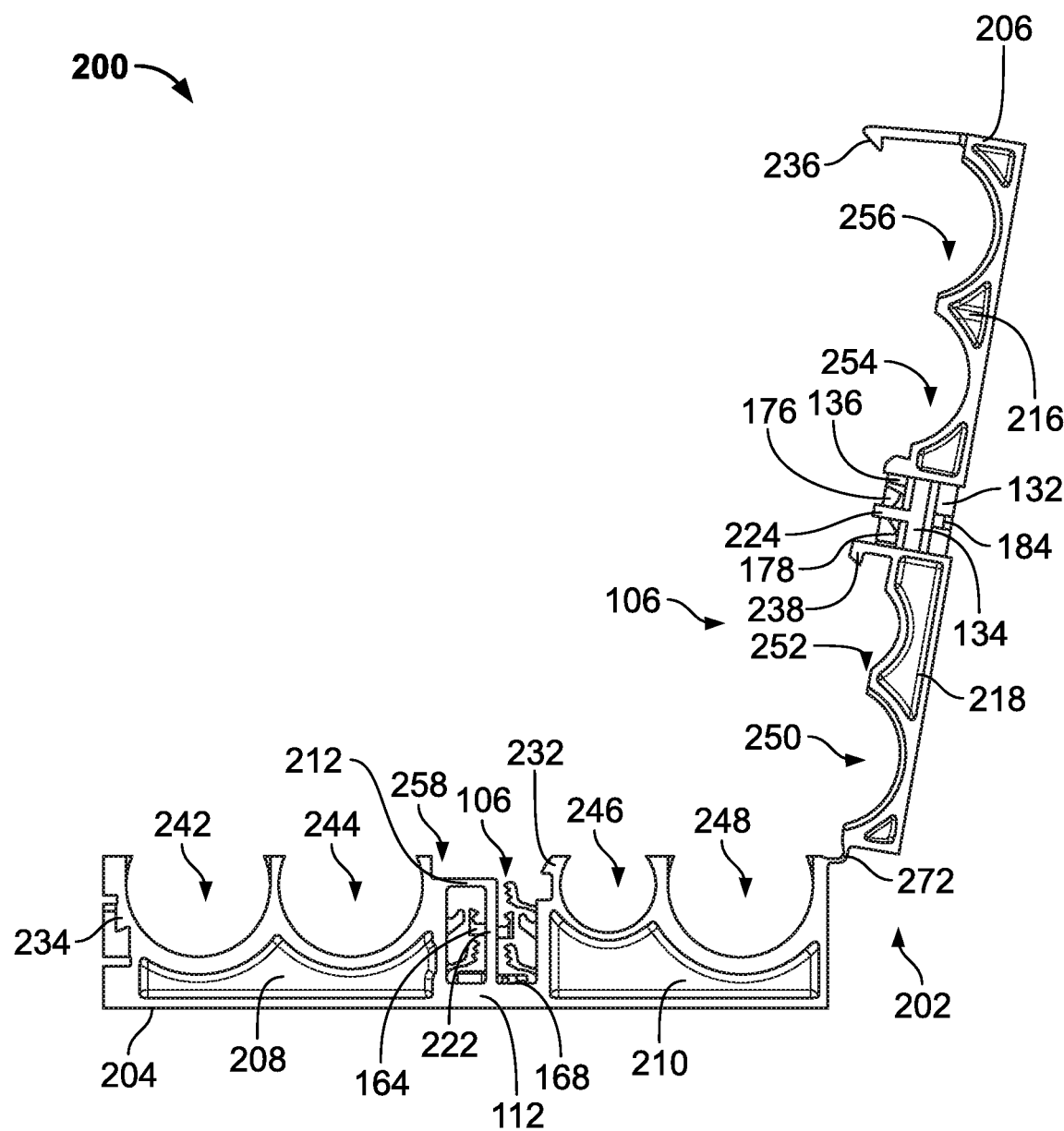
FIG. 12 is an elevational view of a second example push-on fastener in an open position.

With reference to FIG. 12, a second example of a push-on fastener 200 includes one or more of the plurality of stud-engaging features 106 incorporated into a line retainer 202. The line retainer 202 includes a body 204 and a cover 206. The body 204 is pivotably connected to the cover 206.

Figure 13:
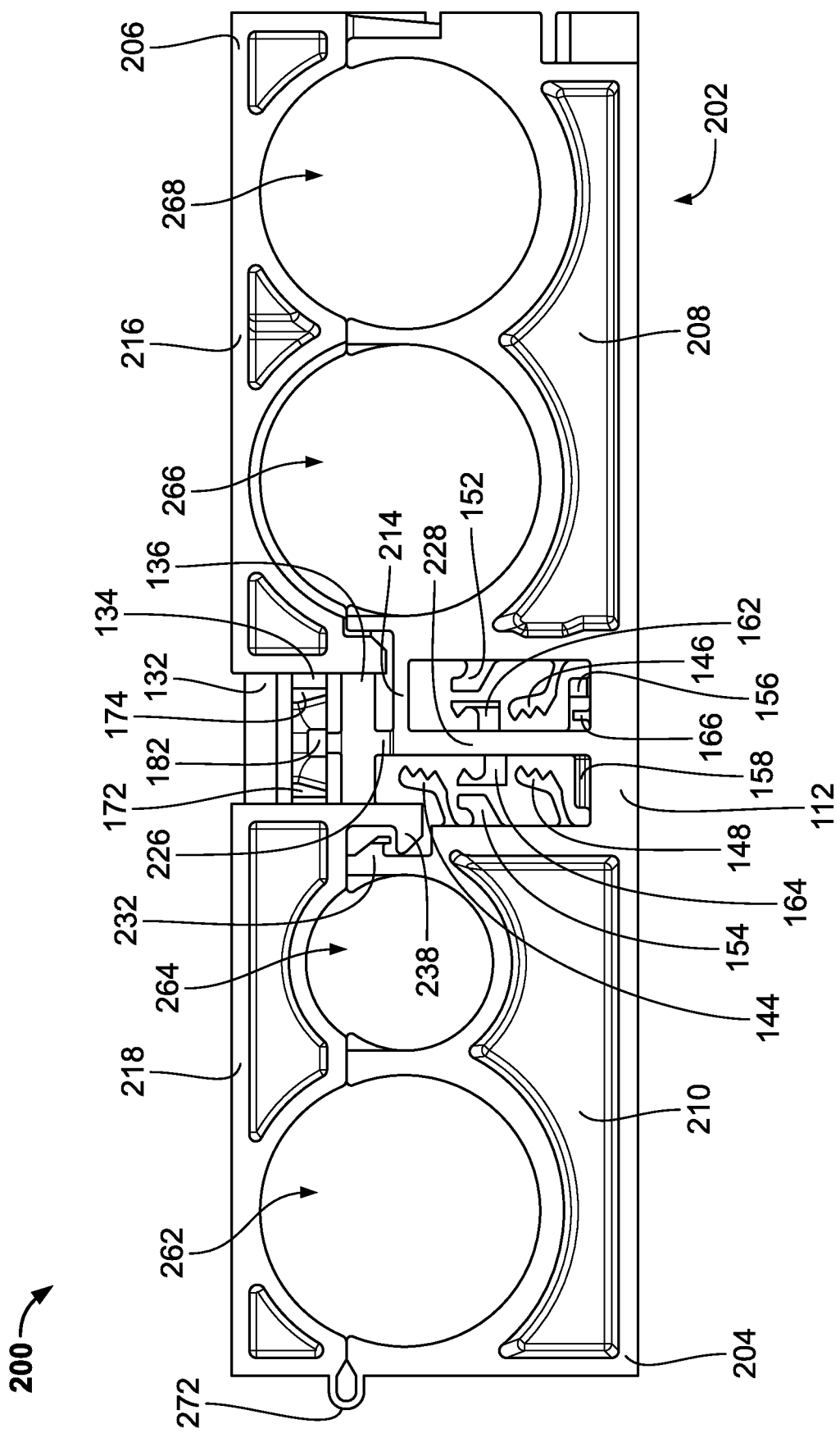
FIG. 13 is an elevational view of the push-on fastener of FIG. 12 in a closed position.

With reference to FIG. 12, the body 204 includes a first portion 208, a second portion 210, and a fourth cross bar 212. The fourth cross bar 212 is connected to and extends from the first portion 208 toward the second portion 210. Referring to FIG. 13, the body 204 also includes a fifth cross bar 214. The fifth cross bar 214 is connected to and extends from the first portion 208 toward the second portion 210.

With reference to FIG. 12, the cover 206 includes a first portion 216, a second portion 218, the first cross bar 132, the second cross bar 134, the third cross bar 136, the third arcuate post 176, the fourth arcuate post 178, and the second protrusion 184. The first cross bar 132, the second cross bar 134, and the third cross bar 136 are connected to and extend between the first portion 216 and the second portion 218. The third arcuate post 176, the fourth arcuate post 178, and the second protrusion 184 are connected to and extend from the third arcuate post 176 between the first portion 216 and the second portion 218. The second protrusion 184 is between the third arcuate post 176 and the fourth arcuate post 178. With reference to FIG. 13, the cover 206 also includes the first arcuate post 172, the second arcuate post 174, and the first protrusion 182. The first arcuate post 172, the second arcuate post 174, and the first protrusion 182 are connected to and extend from the second cross bar 134 between the first portion 216 and the second portion 218. The first protrusion 182 is between the first arcuate post 172 and the second arcuate post 174.

With reference to FIG. 13, the body 204 includes the base portion 112, the second toothed lever 144, the third toothed lever 146, the fourth toothed lever 148, the first stop 152, the second stop 154, the third stop 156, the fourth stop 158, the first radial barb 162, the second radial barb 164, and the third radial barb 166. The base portion 112 is connected to and extends between the first portion 208 and the second portion 210. The second toothed lever 144, the second stop 154, and the fourth toothed lever 148 are connected to and extend from the second portion 210 toward the first portion 208. The third toothed lever 146 and the first stop 152 are connected to and extend from the first portion 208 toward the second portion 210. The third stop 156, the fourth stop 158, and the third radial barb 166 are connected to and extend from the base portion 112. With reference to FIG. 12, the body 204 also includes the fourth radial barb 168. The fourth radial barb 168 is connected to and extends from the base portion 112. Thus, the first portion 208 and the second portion 210 act as axial supports in the same manner as the first axial support 122 and the third axial support 126 of the first example push-on fastener 100 (shown in FIGS. 2-4 and 7-9).

With reference to FIG. 12, the body 204 includes a first axial support 222. The cover 206 includes a second axial support 224. The first axial support 222 is connected to and extends between the base portion 112 and the fourth cross bar 212. The second radial barb 164 is connected to and extends from the first axial support 222. The second axial support 224 is connected to and extends from the second cross bar 134. Referring to FIG. 13, the cover 206 includes a third axial support 226. The body 204 includes a fourth axial support 228. The third axial support 226 is connected to and extends from the third cross bar 136. The fourth axial support 228 is connected to and extends between the base portion 112 and the fifth cross bar 214. The first radial barb 162 is connected to and extends from the fourth axial support 228.

With reference to FIG. 12, the body 204 includes a first barb 232 and a first catch 234. The first barb 232 is connected to and extends from the second portion 210 toward the first portion 208. The first catch 234 is connected to and extends outwardly from the first portion 208. The cover 206 includes a second barb 236 and a second catch 238. The second barb 236 is connected to and extends from the first portion 216 toward the second portion 218. The second catch 238 is connected to and extends from the second portion 218. The first barb 232 and the second catch 238 are shaped to selectively interlock with one another. The first catch 234 and the second barb 236 are also shaped to selectively interlock with one another.

With reference to FIG. 12, the body 204 defines a first channel 242, a second channel 244, a third channel 246, and a fourth channel 248. The cover 206 defines a fifth channel 250, a sixth channel 252, a seventh channel 254, and an eighth channel 256. The body 204 additionally defines a ninth channel 258.

When the push-on fastener 200 is closed, as shown in FIG. 13, the body 204 and the cover 206 define a first opening 262, a second opening 264, a third opening 266, and a fourth opening 268. In operation, the body 204 and the cover 206 may be latched together via the first barb 232, the second catch 238, the first catch 234, and the second barb 236. More specifically, the body 204 and the cover 206 may be latched together with linear components (e.g., fluid lines, brake lines, fuel lines, wires, etc.) disposed in one or more of the first opening 262, the second opening 264, the third opening 266, and the fourth opening 268 (not shown). In other words, the first portion 208 and the second portion 210 of the base 204 and the first portion 216 and the second portion 218 of the cover 206 act as attachment features of the push-on fastener 200. Thus, the push-on fastener 200 may support the linear components. Further, the push-on fastener 200 may space apart and/or isolate the linear components from one another.

With reference to FIGS. 12 and 13, the push-on fastener 200 further includes a hinge 272. In some embodiments, the hinge 272 is a flexible living hinge. The body 204 is pivotably connected to the cover 206 via the hinge 272.

From the foregoing, it will be appreciated that the above first and second example push-on fasteners 100, 200 adapt to multiple stud sizes while reducing the installation force to install the push-on fasteners 100, 200 on a stud. Thus, the push-on fasteners 100, 200 may reduce part number complexity in a manufacturing facility. Further, because the push-on fasteners 100, 200 adapt to multiple stud sizes, material that would otherwise have been used to make a range of different-sized fasteners may be reduced. Thus, the above-disclosed first and second example push-on fasteners 100, 200 conserve resources as compared to existing fasteners.

While various spatial and directional terms, such as top, bottom, lower, mid, lateral, horizontal, vertical, front, and the like may be used to describe examples of the present disclosure, it is understood that such terms are merely used with respect to the orientations shown in the drawings. The orientations may be inverted, rotated, or otherwise changed, such that an upper portion is a lower portion, and vice versa, horizontal becomes vertical, and the like.

Variations and modifications of the foregoing are within the scope of the present disclosure. It is understood that the examples disclosed and defined herein extend to all alternative combinations of two or more of the individual features mentioned or evident from the text and/or drawings. All of these different combinations constitute various alternative aspects of the present disclosure. The examples described herein explain the best modes known for practicing the disclosure and will enable others skilled in the art to utilize the disclosure. The claims are to be construed to include alternative examples to the extent permitted by the prior art.

What is claimed is:

1. A push-on fastener, comprising:
   a base defining an opening configured to receive a stud;
   a first axial support and a second axial support that each extend from the base;
   a first toothed lever extending from the first axial support;
   a second toothed lever extending from the second axial support; and
   a first barb extending from one of the base, the first axial support, and the second axial support,
   wherein the first barb, the first toothed lever, and the second toothed lever are configured to engage the stud when received in the opening, and
   wherein the first toothed lever and the second toothed lever are resiliently pivotable.

2. The push-on fastener of claim 1, wherein a second barb extends from one of the base, the first axial support, and the second axial support and is configured to engage the stud when received in the opening.

3. The push-on fastener of claim 2, wherein the second barb is arcuate.

4. The push-on fastener of claim 1, further comprising an attachment feature connected to a top portion.

5. The push-on fastener of claim 4, wherein the top portion is connected to the base via a tapered ramp portion.

6. The push-on fastener of claim 1, further comprising a cross bar connected to the first axial support.

7. The push-on fastener of claim 6, further comprising an arcuate post extending from the cross bar.

8. The push-on fastener of claim 6, wherein a first protrusion extends from the cross bar.

9. The push-on fastener of claim 6, wherein the second axial support is connected to the the cross bar.

10. The push-on fastener of claim 9, wherein the cross bar is a first cross bar and further comprising
    a third axial support connected to the base and the first cross bar, and
    a second cross bar connected to the second axial support and the first axial support.

11. The push-on fastener of claim 1, wherein
    a stop that extends from the first axial support.

12. The push-on fastener of claim 11, wherein the stop limits pivoting movement of the first toothed lever relative to the first axial support.

13. The push-on fastener of claim 1, wherein
    a stop extends from the base.

14. The push-on fastener of claim 13, further, where the stop limits pivoting movement of the second toothed lever relative to the second axial support.

15. The push-on fastener of claim 1, wherein the first toothed lever extends toward the second toothed lever.

16. A push-on fastener, comprising:
a base defining an opening;
a first axial support and a second axial support that each extend from the base;
a third axial support extending from the base between the first and second axial supports;
a first protrusion extending from the third axial support;
a first toothed lever extending from the first axial support;
a second toothed lever extending from the second axial support; and
wherein the first protrusion, the first toothed lever, and the second toothed lever are configured to engage a stud.

17. The push-on fastener of claim 16, wherein a first cross bar extends between the first axial support and the second axial support.

18. The push-on fastener of claim 17 wherein a second protrusion extends from the first cross bar and is configured to engage the stud.

19. A push-on fastener, comprising:
a base defining an opening;
a first axial support and a second axial support extending from the base;
first and second cross bars extending between the first and second axial supports;
an arcuate post extending from the first cross bar; and
a second arcuate post extending from the second cross bar toward the first cross bar,
wherein the fastener is configured to receive a stud in the opening between the first arcuate post and the second arcuate post.

20. The push-on fastener of claim 19, wherein a third axial support extends from the base to the first cross bar, and a fourth axial support extends from the base to the second cross bar.

* * * * *